(12) United States Patent
Mulligan et al.

(10) Patent No.: US 11,938,407 B2
(45) Date of Patent: Mar. 26, 2024

(54) PLAYER IDENTIFICATION SYSTEM AND METHOD

(71) Applicant: Sony Interactive Entertainment Inc., Tokyo (JP)

(72) Inventors: Paul Terrence Mulligan, Hatfield (GB); Ashley Sanders, Rickmansworth (GB)

(73) Assignee: Sony Interactive Entertainment Inc., Tokyo (JP)

( * ) Notice: Subject to any disclaimer, the term of this patent is extended or adjusted under 35 U.S.C. 154(b) by 595 days.

(21) Appl. No.: 16/705,322

(22) Filed: Dec. 6, 2019

(65) Prior Publication Data
US 2020/0188795 A1    Jun. 18, 2020

(30) Foreign Application Priority Data
Dec. 14, 2018   (GB) .................................. 1820420.6

(51) Int. Cl.
| | |
|---|---|
| *A63F 13/79* | (2014.01) |
| *A63F 13/86* | (2014.01) |
| *G06V 20/40* | (2022.01) |
| *G06V 20/62* | (2022.01) |
| *G06V 30/148* | (2022.01) |
| *G06V 30/10* | (2022.01) |

(52) U.S. Cl.
CPC .............. *A63F 13/86* (2014.09); *A63F 13/79* (2014.09); *G06V 20/41* (2022.01); *G06V 20/42* (2022.01); *G06V 20/62* (2022.01); *G06V 30/153* (2022.01); *G06V 30/10* (2022.01)

(58) Field of Classification Search
CPC . A63F 13/79; G06K 9/00; G06K 9/34; G06K 9/344; G06K 9/00718
See application file for complete search history.

(56) References Cited

U.S. PATENT DOCUMENTS

| | | | | |
|---|---|---|---|---|
| 5,746,656 | A  * | 5/1998 | Bezick | A63F 13/12 463/42 |
| 10,449,461 | B1 * | 10/2019 | Verma | A63F 13/86 |
| 2002/0116195 | A1 * | 8/2002 | Pitman | G06Q 30/06 704/260 |
| 2007/0279494 | A1 * | 12/2007 | Aman | G06V 20/40 348/169 |
| 2008/0143880 | A1 |  6/2008 | Jung | |

(Continued)

FOREIGN PATENT DOCUMENTS

CN          107297074 A     10/2017

OTHER PUBLICATIONS

Examination Report for corresponding GB Application No. 1820420.6, 2 pages, dated May 25, 2021.

(Continued)

*Primary Examiner* — David L Lewis
*Assistant Examiner* — Shauna-Kay Hall
(74) *Attorney, Agent, or Firm* — Matthew B. Dernier, Esq.

(57) ABSTRACT

A player identification system for identifying players from recorded video content, the system including a video content analysis unit operable to analyse one or more frames of video content, a player name identification unit operable to identify player names in one or more analysed frames of the video content, and a data generation unit operable to generate data relating to the video in dependence upon one or more identified player names.

12 Claims, 3 Drawing Sheets

(56) References Cited

U.S. PATENT DOCUMENTS

| | | | | |
|---|---|---|---|---|
| 2008/0192116 | A1* | 8/2008 | Tamir | G06T 7/292 |
| | | | | 348/157 |
| 2010/0035689 | A1* | 2/2010 | Altshuler | A63F 13/30 |
| | | | | 463/39 |
| 2011/0053693 | A1* | 3/2011 | Wright | A63F 9/24 |
| | | | | 463/42 |
| 2012/0294591 | A1* | 11/2012 | Alexander | H04N 21/4583 |
| | | | | 386/292 |
| 2014/0121022 | A1* | 5/2014 | Shah | A63F 13/50 |
| | | | | 463/37 |
| 2015/0208138 | A1 | 7/2015 | Oguchi | |
| 2015/0266548 | A1* | 9/2015 | Crosby | B63B 21/26 |
| | | | | 248/508 |
| 2016/0144281 | A1* | 5/2016 | Ikeda | A63F 13/75 |
| | | | | 463/29 |
| 2016/0365121 | A1* | 12/2016 | DeCaprio | H04N 9/8205 |
| 2017/0124399 | A1* | 5/2017 | Bostick | G11B 27/34 |
| 2017/0157512 | A1* | 6/2017 | Long | A63F 13/497 |
| 2017/0228600 | A1* | 8/2017 | Syed | G06V 20/62 |
| 2021/0281887 | A1* | 9/2021 | Tong | G06T 7/20 |

OTHER PUBLICATIONS

Examination Report for corresponding GB Application No. 1820420. 6, 4 pages, dated Jan. 27, 2021.
Combined Search and Examination Report for corresponding GB Application No. 1820420.6, 5 pages, dated Jun. 3, 2019.
Extended European Search Report for corresponding EP Application 19196462.6, 8 pages, dated Nov. 28, 2019.
C. Misra et al: "Text Extraction and Recognition from Image using Neural Network" International Journal of Computer Applications, vol. 40, No. 2, pp. 13-19, Feb. 1, 2012.
Communication Pursuant to Article 94(3) for corresponding EP Application No. 19196462.6, 5 pages, Feb. 9, 2022.

* cited by examiner

PLAYER IDENTIFICATION SYSTEM AND METHOD

BACKGROUND OF THE INVENTION

Field of the Invention

This disclosure relates to a player identification system and method.

Description of the Prior Art

Over the years there has been an increase in the perceived importance of the social aspect of gaming, driven by both the increasing complexity of games and the ease with which experiences may be shared (for example, via instant messaging or internet platforms). It has long been desirable to share gaming experiences with friends and/or other players, although initially this was embodied largely in the ability of a user to save a replay locally that may be replayed when the user is visited by friends.

Of course, there has been a significant departure from this approach for sharing gaming experiences between users. Nowadays, players are able to transmit large quantities of data in a short period of time so as to enable the sending and receiving of video replays. In addition to that, the increase in popularity of live streaming (for example, capturing and sharing video of gameplay in real time via the internet) has also become a popular method for sharing content. Users may also be able to upload video content, which may be edited to increase the appeal to viewers, to content-sharing websites after the fact. These changes in sharing methods each contribute to the large, and rapidly increasing, body of video content relating to gaming that is available online.

However, an informal sharing of large quantities of content between users naturally makes content harder to manage. For example, video content that is uploaded to a website may not be associated with information that identifies the correct game, characters in the game, and/or players of the game, for example. This makes it difficult to present content in an intuitive and useful manner, which hinders the ability of users to be able to locate relevant content or content that is potentially of interest to that user.

This may also be problematic for those who generate such content. With many players being considered equivalent to sports personalities, there is a significant interest for these players to be able to locate such content in order to be able to manage their exposure and public image.

It is in the context of the above problems that the present invention arises.

SUMMARY OF THE INVENTION

A player identification system is disclosed and described herein.

A player identification method is also disclosed and described herein.

The above and other respective aspects and features of the disclosure are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
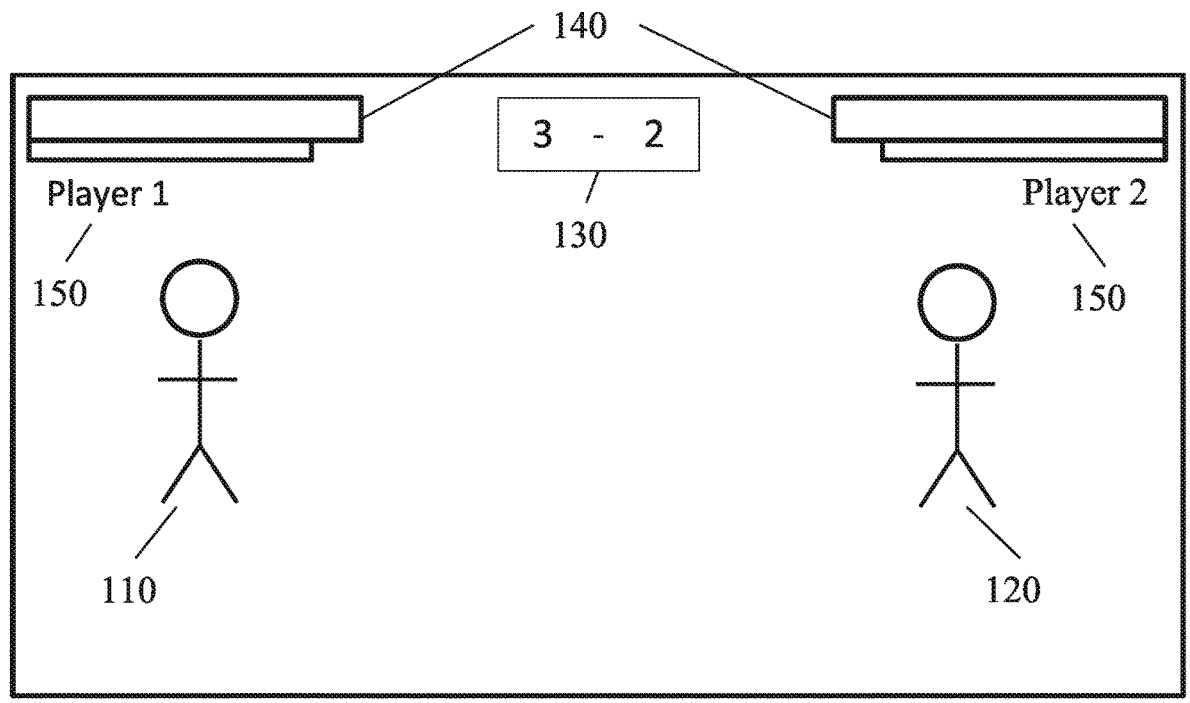
FIG. 1 schematically illustrates a frame of video content representing gameplay.

Referring now to the drawings, wherein like reference numerals designate identical or corresponding parts throughout the several views, FIG. 1 shows an example of a frame 100 of video content representing gameplay, where the game is a two-dimensional fighting game. This frame comprises a pair of players 110 and 120, a scoreboard 130 indicating the number of rounds won by each player, status bars (indicating character health, for example) 140 and player names 150 ('Player 1' and 'Player 2'). Such an example is of course a simple case selected for the sake of the clarity of the following description; more complex games (such as those with full three-dimensional motion) may of course be considered in any suitable embodiments, as well as those with more or fewer of players. Indeed, any number of player names could be identified, rather than being limited to just two; in some games, hundreds of player avatars may be present in the virtual environment and in some embodiments it may be advantageous to identify some or all of those that appear in the camera's field of view.

The frame 100 of video content may be stored as a part of a video stored online, the video being available for streaming and/or download by users.

Figure 2:
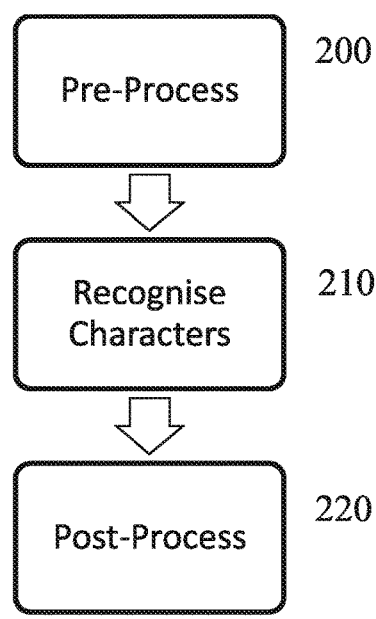
FIG. 2 schematically illustrates a character recognition process.
Figure 3:
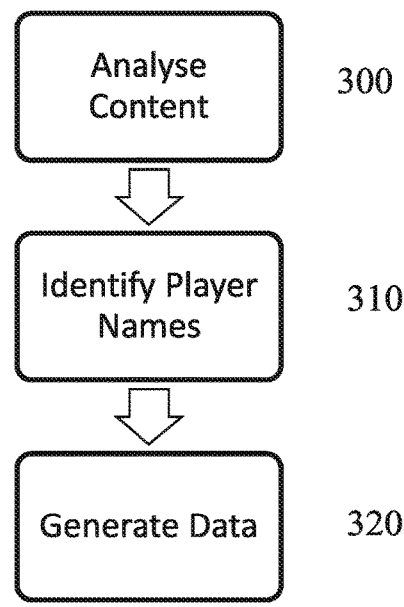
FIG. 3 schematically illustrates a player name identification process.

FIG. 2 schematically illustrates a character recognition process, which may be implemented in the player identification method of FIG. 3. The process described with reference to FIG. 2 may be performed on a single frame of a video, such as that of FIG. 1, a plurality of such frames, and/or a substantial part of a video (a large number of consecutive or non-consecutive frames).

At a step 200, pre-processing of the image frame to be analysed is performed. This step comprises any modification or processing to be applied to the image frame in order to aid character recognition.

For example, this step may comprise applying rotations to all or one or more parts of the image frame if text is not well-aligned with the horizontal/vertical direction. Edge-smoothing algorithms may also be applied, which may assist with making characters more identifiable, and a process may be performed that identifies where in the image text appears so as to reduce the area upon which character recognition is performed.

At a step 210, character recognition in the pre-processed image frame is performed. Any appropriate processing for identifying the characters may be used, such as pattern matching or feature extraction methods, or any suitable machine learning technique.

At a step 220, post-processing of the image frame, upon which the character recognition has been performed, may be performed as necessary. This post-processing can be used to refine the results of the character recognition, for example by reducing the amount of uncertainty in the recognition results or to correct errors. One example of such a method is that of comparing strings of identified characters to a dictionary.

While such a method may not be suitable for recognising player names, the dictionary could incorporate a list of player aliases that are used in that game (for example) to overcome this.

In some embodiments, it may be advantageous to perform the method of FIG. 2 in an iterative manner. For example, an initial, low-detail analysis could be used to identify where words/characters are without being detailed enough to reliably identify each of the letters. A higher-detail analysis could then be performed upon the areas in which words/characters are identified. Such a method may be faster or require fewer processing resources in some embodiments.

FIG. 3 schematically illustrates a player identification method for identifying players from recorded video content.

A step 300 comprises analysing one or more frames of video content. This analysis may comprise analysing any associated metadata corresponding to the video content, for example, and alternatively (or additionally) image processing may be performed, in order to identify one or more characteristics of the video content.

For example, these characteristics may include the title of the game being played in the video content (for example, by identifying distinctive objects/characters/overlays, or obtaining this from metadata), the number of players in the game (for example, by counting the number of characters on the screen in a game such as that shown in FIG. 1), the outcome of the game (for example, by monitoring a scoreboard or identifying a victory/defeat screen), and/or the genre of the game. Each of these characteristics may be used to improve the player name identification process, or to improve the use of the player name information once identified.

Processes such as those discussed with reference to step 200 of FIG. 2 may also be performed as a part of the image analysis of step 300.

Rather than being limited to only analysing image frames in the video content, audio associated with the images (such as a voiceover) may also be analysed in order to identify characteristics of the game. For example, a voiceover may introduce the game being played and/or a player name—both of these may be useful information in identifying players in the game. Image frames for analysis may also be selected to be those that show title screens or the like, so as to identify the game being played without relying on detailed knowledge of the gameplay of individual games.

A step 310 comprises identifying player names in one or more analysed frames of video content. This step employs a method such as that described with reference to FIG. 2, in which optical character recognition is performed on video content. For example, the step 310 may encompass steps 210 and optionally 220 of FIG. 2.

A number of techniques may be applied during the identification stage in order to improve the identification of player names. For example, information about the format of player names may be used to assist in determining whether text is likely to be a player name.

A first example of this is the use of game-specific information. For instance, player names may be required to have a specific format or are displayed in a particular format. In some games, a player's team name is displayed on-screen alongside their player name. An example of this could be the format '[team 1] Player 1'; the requirement of a team name being displayed first in this manner means that any word (or words) following closed square brackets is likely to be a player name.

Another example of a predictable format is when a phrase typically associated with the display of a user name is shown, such as 'player _____ has signed in' or 'has left', or 'User ID'. Such terms may searched for on a generic basis, or phrase specific to a game may be used when the title of the game is known (for example from metadata).

A second example of an improvement to the identification process, which may be used in conjunction with or instead of the first example, is the identification of characters (or character sequences) that are not common within words found in the dictionary or words used in the game.

For instance, the character sequence 'xXx' is often found in the names of online players while not appearing in words found in the dictionary. If such a sequence were identified, this would be an indicator that the sequence is a part of a player's name. Of course, any number of other characters could be identified as being indicative of a player's name; obscure punctuation or combinations of punctuation, an abundance of less-common letters such as 'z', or the use of characters from other alphabets (such as Greek or Cyrillic) which are not used in the game could all be reliable indicators of player names.

In some embodiments, if a list of possible player names is known (for example, a list of player names for an online service), an analysis may be performed to identify the most promising indicators before the identification process is performed. Similarly, an analysis of the text used by a game (such as in dialogue, GUIs, or menus) may be performed; any character strings or the like that do not align with this analysis (that is, character strings or the like that differ from the common game text) may be taken as being indicators of a player name. This is an example of an embodiment in which identified strings of characters are compared to a database of player profiles to identify a corresponding player profile for the identified player name.

In some embodiments, a reduced (e.g. filtered) database of player profiles is used for comparison in accordance with information about the video content and/or player profiles; that is, players that are known to play the game shown in the content may be the subject of a reduced database, or players that are known to play with an already-identified party (such as the video uploader, or another player in the game).

Another potential indicator is that of the length of a character string. While a string of four or five characters could easily be a player name or a normal word, a string of fourteen or fifteen characters is significantly more likely to be the name of a player in the game. It may therefore be possible to identify candidates for player names in dependence upon the length of the character string. Analysis of a game may be performed to refine the indicator detection, for example in identifying the longest word used in the game so as to identify a threshold number of characters in a string to be able to guarantee that any longer string is a player name.

Similarly, processing may be performed that identifies whether or not a character string belongs to a complete sentence. In many cases player names are provided only in a standalone fashion, and as such any character strings in a full sentence may be dismissed as a part of the player identification method in some embodiments. Full sentences may be identified by an above-threshold number of words in a sequence, the first of which begins with a capital letter and the last of which is followed by a punctuation mark, for example. Alternatively, more complete processing may be performed to identify a sentence, such as an analysis of the words used to identify a noun and a verb in close proximity which may indicate a sentence.

An additional, or alternative, potential indicator may also be that of the location of the identified string. For example, dialogue in the game may be located in a particular area of the screen (such as in the middle at the bottom, in the case of subtitles) while player names may be located near a scoreboard or move with a corresponding player's avatar. Analysis of a game may therefore be performed to identify which, if any, areas of the screen are commonly associated with player names (or an absence of player names). In some examples, an iterative process is implemented in which the location of identified names is recorded such that later identification processes may utilise this information to refine the search for player names.

A further potential indicator may be considered to be the duration for which text is displayed on the screen. Of course, such an analysis may be required to be performed for a significant number of frames—although these need not be consecutive. This indicator makes use of the fact that dialogue (or the like) is unlikely to be displayed for a significant amount of time; this is in contrast to player names, which may be visible for the entire game. Of course, other game-specific words may also be displayed for a significant amount of time (such as 'score' on a scoreboard), but such an indicator may still be useful in refining the player name identification process as it may still be able to reduce the number of candidate character strings to be considered as potential player names.

It may also be advantageous to identify fonts used within the content. In a first example, this may be advantageous in assisting with character recognition if fonts used in the content are particularly awkward to read/identify. Secondly, it may be the case that player names are provided in a different font to other writing found within the content. In this case, it may be possible to identify text that is likely to be a player's name based upon identified fonts within the content.

In summary of the above, it is considered that strings of characters may be recognised as candidates for player names based upon one or more of:
1. whether the string of characters forms a complete sentence;
2. the number of characters included in the string of characters;
3. the identity of characters included in the string of characters;
4. the font used to display the string of characters;
5. the location of the string of characters in the one or more frames of video content;
6. an association with another generic or specific key phrase or character string; and
7. the duration for which the string of characters is displayed in the video content.

Of course, any suitable combination of one or more of these indicators may be considered in embodiments of the present disclosure, and indeed other indicators may be considered in addition to or instead of these.

A step 320 comprises generating data relating to the video in dependence upon one or more identified player names.

The data that is generated in this step may vary significantly depending on the desired application. In a most simple example, data is generated that is supplied with the content that identifies that players present in the content without further information. In a more complex example, data may be generated that identifies the players present as well as a result of the game (such as which player won, and/or a final score), tournament information (if applicable, for example where the content is a semi-final match then the identity of a player reaching the final could be identified), and/or information enabling users to locate further content for the same players (such as links to social media or other content). More broadly, player performance information could also be generated and linked to a particular player that has been identified in the content.

For example, the generated data may be used to associate the video content with an identified player's player profile. This enables a player's profile to be automatically populated with relevant video content, improving their online presence in addition to assisting users in finding content associated with that player.

The process outlined with reference to FIG. 3 could be implemented using a machine learning method, in some embodiments. Such a method may be particularly suitable for performing a player name identification process, given the range of different player names and different types of content that are available.

For example, supervised learning techniques could be utilised for this purpose. For example, a pair of neural networks could be used in combination to identify player names in the content and identify contextual elements that indicate character strings that are likely to be player names. For example, a first neural network may be trained to identify player names in accordance with the method described with reference to FIG. 3; in some examples video content may be pre-labelled as comprising one or more player names. A second neural network may then be used to identify the context that indicates that a character string is likely to be a player name; for example, determining factors such as character strings or display locations that are more commonly associated with player names than other text.

Deep reinforcement learning provides a further option for developing a system that is effective at identifying player names in content. Such methods rely on providing a 'reward' to a system that is analysing content to identify events of interest; of course this does not need to be a reward in the traditional sense, rather it is an acknowledgement that the actions of the system have led to a positive outcome (that is, the identification of an event of interest). By using such an iterative process, it can be possible to train a machine learning process to identify player names in content reliably.

Figure 4:
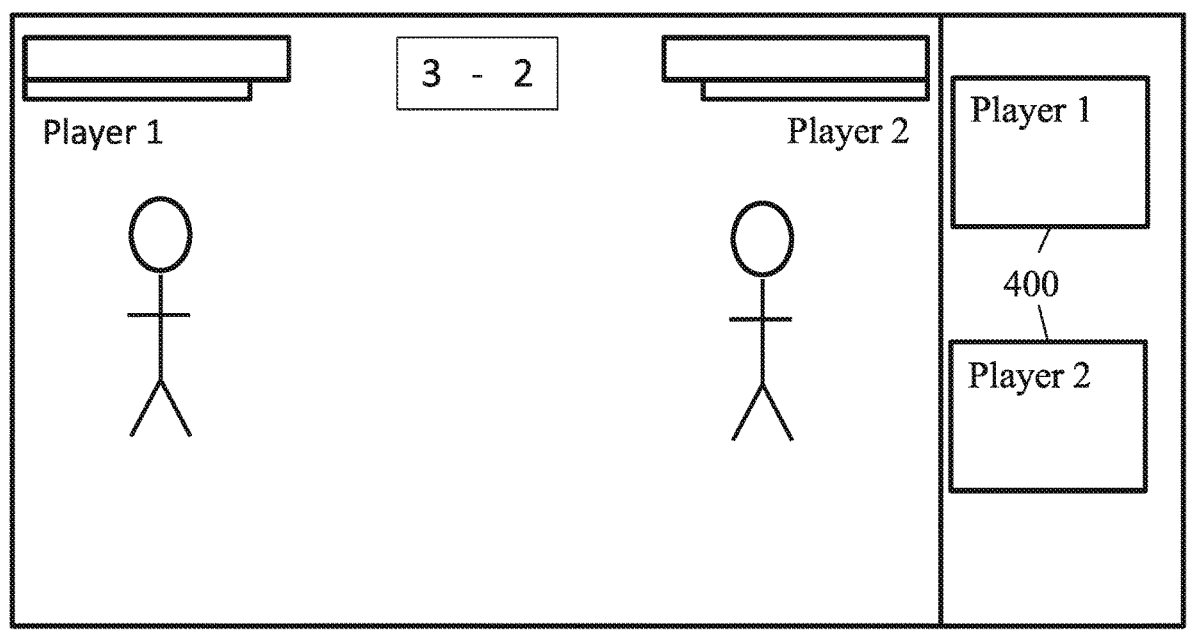
FIG. 4 schematically illustrates a frame of video content representing gameplay with displayed player identification data.

FIG. 4 schematically illustrates a frame of video content representing gameplay with displayed player identification data 400. The player identification data 400 may appear in a sidebar separate to the content, although it could be provided in any suitable manner (such as being overlaid upon the content itself, or displayed when a user moves a cursor or the like).

The player identification data 400 shows only the player names, although as described above any other suitable information may also be included. In addition to this, the player identification data 400 could be provided as a hyperlink or the like that a user may select to be redirected to a player's profile.

As discussed above, in some cases the generated data comprises tournament information or results information or the like. In such cases, the generated data may comprise indications of player rankings and/or be used to populate spreadsheets or results tables associated with the content (or a tournament). This information could also be provided alongside the player identification data 400.

Figure 5:
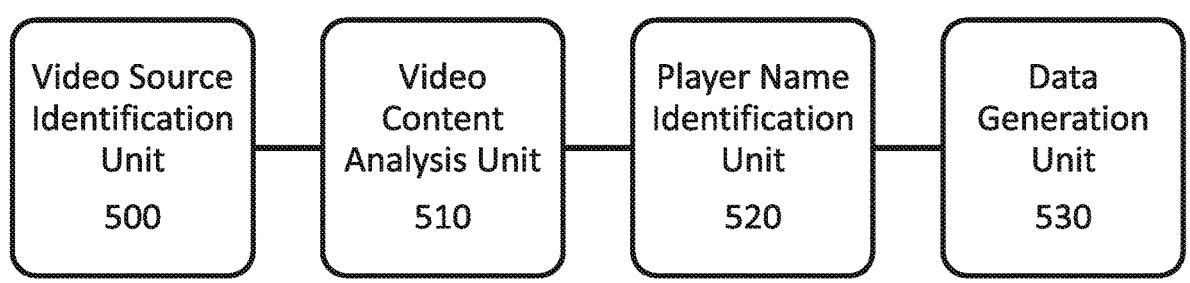
FIG. 5 schematically illustrates a player identification system for identifying players from recorded video content.

FIG. 5 schematically illustrates a player identification system for identifying players from recorded video content. The system comprises a video source identification unit 500, a video content analysis unit 510, a player name identification unit 520, and a data generation unit 530. Such a system may be operable to implement the method of FIG. 3, for example. As discussed above, the recorded video content may be a recording of a game being played by one or more players.

The video source identification unit 500 is operable to identify a source application from which the video content is generated. The inclusion of the video source identification unit 500 in the player identification system may be optional, as the process may be performed even without knowing which application has generated the video content. The video source identification unit 500 may be operable to examine metadata associated with the video content or perform an analysis of the content to identify a source application; for example, metadata may simply include the title of a game being played, or image processing may be performed on frames of video content to derive a game name either directly or by recognising elements in the game (such as fonts, characters, GUIs or menus) that are indicative of a particular game.

The video content analysis unit 510 is operable to analyse one or more frames of video content. The analysis performed by the video content analysis unit 510 may be the same as that described above with reference to step 300 of FIG. 3.

The player name identification unit 520 is operable to identify player names in one or more analysed frames of the video content. The method implemented by the player name identification unit 520 may be the same as that described above with reference to step 310 of FIG. 3. For example, the player name identification unit 520 may be operable to perform an optical character recognition process on one or more regions of one or more of the analysed frames of video content. As discussed above the one or more regions may be selected in dependence upon the content of the video content, for example using information about the game or the location of text to determine where player names are likely to be.

In some embodiments, the player name identification unit 520 is operable to use a machine learning algorithm to identify player names.

The data generation unit 530 is operable to generate data relating to the video in dependence upon one or more identified player names. The method implemented by the data generation unit 530 may be the same as that described above with reference to step 320 of FIG. 3. In some examples, the generated data is associated with the video content as metadata, while in others it may be stored and/or utilised separately. As described above, in some embodiments the generated data is indicative of an identified player's identity and/or performance.

Whilst the above description assumes that generated data can be associated with a video, this may not always be possible. For example in the case of legacy video content such as existing videos hosted by providers that themselves do not implement the techniques and methods described herein.

In such a case, the generated data may be stored in association with a URL or similar identifier of where the video can be found, locally and/or on a remote server.

Subsequently, when accessing the video again, the URL can be used to find the associated generated data, for example via a look-up table or other associative link.

Advantageously, it will be appreciated that many hosted videos are watched by a large number of viewers. Accordingly, it may be that the above methods and techniques have been applied to a video by a device of a previous viewer (or, of course possibly the host of the video themselves), and so by submitting a URL or similar identifier for such a video, previously generated data may be received in return, thereby avoiding an unnecessary repetition of the identification process.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A player identification system for identifying players from recorded video content, the system comprising:
    a video content source identification unit operable to identify a source application from which the video content is generated;
    a video content analysis unit operable to analyse one or more frames of video content responsive to the identified source application by the video content source identification unit;
    a player name identification unit operable to identify player names in one or more analysed frames of the video content; and
    a data generation unit operable to generate data relating to the video in dependence upon one or more identified player names, wherein the generated data associates the video content with an identified player's player profile.

2. A system according to claim 1, wherein the recorded video content is a recording of a video game being played by one or more players.

3. A system according to claim 1, wherein the player name identification unit is operable to perform an optical character recognition process on one or more regions of one or more of the analysed frames of video content and to identify one or more strings of characters recognised using the optical character recognition process as being player names.

4. A system according to claim 3, wherein the one or more regions are selected in dependence upon the content of the video content.

5. A system according to claim 3, wherein strings of characters may be recognised as candidates for player names based upon one or more of:
    whether the string of characters forms a complete sentence;
    the number of characters included in the string of characters;
    the identity of characters included in the string of characters;
    the font used to display the string of characters;
    the location of the string of characters in the one or more frames of video content;
    an association with another generic or specific key phrase or character string; and the duration for which the string of characters is displayed in the video content.

6. A system according to claim 1, the player name identification unit is operable to use a machine learning algorithm to identify player names.

7. A system according to claim 6, wherein identified strings of characters are compared to a database of player profiles to identify a corresponding player profile for the identified player name.

8. A system according to claim 7, wherein a reduced database of player profiles is used for comparison in accordance with information about the video content and/or player profiles.

9. A system according to claim 1, wherein the generated data is associated with the video content as metadata.

10. A system according to claim 1, wherein the generated data is indicative of an identified player's identity and/or performance.

11. A player identification method for identifying players from recorded video content, the method comprising:
 identifying a source application from which the video content is generated;
 analysing one or more frames of video content responsive to the identified source application by the identifying step;
 identifying player names in one or more analysed frames of video content;
 generating data relating to the video in dependence upon one or more identified player names, wherein the generated data associates the video content with an identified player's player profile.

12. A non-transitory machine-readable storage medium which stores computer software, which when executed by a computer, causes the computer to carry out a player identification method for identifying players from recorded video content, the method comprising:
 identifying a source application from which the video content is generated;
 analysing one or more frames of video content responsive to the identified source application by the identifying step;
 identifying player names in one or more analysed frames of video content;
 generating data relating to the video in dependence upon one or more identified player names, wherein the generated data associates the video content with an identified player's player profile.

\* \* \* \* \*